(12) United States Patent
Moffa

(10) Patent No.: US 6,554,357 B2
(45) Date of Patent: Apr. 29, 2003

(54) SYSTEM FOR RELEASABLY SECURING A CHILD SEAT TO A STOWABLE SEAT

(75) Inventor: Michael Douglas Moffa, Glenview, IL (US)

(73) Assignee: Freedman Seating Company, Chicago, IL (US)

( * ) Notice: Subject to any disclaimer, the term of this patent is extended or adjusted under 35 U.S.C. 154(b) by 0 days.

(21) Appl. No.: 10/121,889

(22) Filed: Apr. 12, 2002

(65) Prior Publication Data

US 2002/0109382 A1 Aug. 15, 2002

Related U.S. Application Data

(63) Continuation-in-part of application No. 09/715,486, filed on Nov. 17, 2000, now Pat. No. 6,485,102.

(51) Int. Cl.[7] ................................................. A47C 1/08
(52) U.S. Cl. ........................................ 297/253; 297/254
(58) Field of Search ............................. 297/250.1, 253, 297/254, 325, 326, 334

(56) References Cited

U.S. PATENT DOCUMENTS

| 5,487,588 | A | * | 1/1996 | Burleigh et al. ............. 297/253 |
| 5,492,389 | A | | 2/1996 | McClintock et al. |
| 5,941,601 | A | * | 8/1999 | Scott et al. .................. 297/253 |
| 6,030,046 | A | * | 2/2000 | Dorow ......................... 297/464 |
| 6,082,818 | A | * | 7/2000 | Muller ....................... 297/250.1 |
| 6,193,310 | B1 | * | 2/2001 | Batalaris et al. ............. 297/253 |
| 6,209,957 | B1 | * | 4/2001 | Baloga et al. .............. 297/253 |
| 6,481,800 | B2 | * | 11/2002 | Duncan .................... 297/452.2 |

* cited by examiner

Primary Examiner—Anthony D. Barfield

(57) ABSTRACT

The invention relates to a system for removably associating a child seat to a dual occupancy stowable seat. In addition to being able to secure a child seat, the stowable seat has a deployed position and a stowed position. The stowed position provides space for storing a wheel chair or other item in the space formerly occupied by the deployed seat. The deployed position is utilized for seating or for statically securing up to two child seats. For the purpose of securing a child seat, the stowable seat has one or more anchor systems, which are an integral and permanent part of a previously existing seat frame of sufficient strength and durability or are installed as OEM in the vehicle. The anchor system is arranged and positioned such that when it is not being used to secure a child safety seat it will not interfere with the ability of the stowable seat to provide seating for an occupant or interfere with the stowable seat's movement from the deployed to the stowed position.

3 Claims, 4 Drawing Sheets

SYSTEM FOR RELEASABLY SECURING A CHILD SEAT TO A STOWABLE SEAT

This application is a continuation in part from application Ser. No. 09/715,486 with a filing date of Nov. 17, 2000 now U.S. Pat. No. 6,485,102. Freedman Seating Company is the assignee of this application and application Ser. No. 09/715, 486. There is one or more inventors in common between the applications.

BACKGROUND OF INVENTION

Systems for securing child seats have become more and more popular and thus have also become more and more inventive and effective in manners of securing the child seat to a vehicle seat. Most commonly a child seat rests on a vehicle seat and is secured thereon by the corresponding vehicle seat belt. This method is effective in preventing a child seat from flying off the vehicle seat when rapid deceleration of the respective automobile occurs, as in an accident. However, even when the vehicle's seat belt is pulled tight, there is still undesirable slipping and movement of the child seat on the vehicle seat which may allow for the tippage of the child seat or additional snapping forward of the child seat and thus excessive torque and force upon the infant.

There have been many recent improvements on the common method of securing a child seat to the vehicle seat rather then merely through the use of the vehicle's seat belt. Darrow in U.S. Pat. No. 6,030,046 disclosed an apparatus for anchoring a child seat within a motor vehicle through the use of an anchorage bar. Stack, et al. in U.S. Pat. No. 6,095,604 disclosed a child seat with a tether hook on a strap, and a vehicle seat with a connector receptacle on the rear portion of the seat, whereby the tether hook is associated with the connector receptacle. Also, Jackson et al. in U.S. Pat. No. 6,082,819 disclosed a child seat with a removable base frame, whereby said base frame is directly and removably attachable to a vehicle seat frame.

The instant invention relates to a system of removably securing a child seat to a stowable seat that has a deployed position and a stowed position. The stowed position permits a wheel chair or other article to be stored in the space formerly occupied by the fold away seat while in the stowed position. In contrast, the deployed position may be used to provide seating occupants or for removably securing a child seat in static fashion. The transition from the deployed position to the stowed position works under similar principles disclosed in U.S. Pat. No. 5,492,389.

This invention utilizes an anchor system to provide an effective method of securing the stowable seat to a child seat in order to increase the likelihood that child seat remains properly secured in the event of rapid deceleration or acceleration. The anchor system is oriented such that when it is not securing a child seat it will not interfere with the ability of the stowable seat to provide seating for an occupant or to be compacted and subsequently positioned in the stowed position.

The instant invention will enable the transit industry to more fully comply with the requirements that are set out in Federal Motor Vehicle Safety Standard Regulation 571,225. Additionally, this invention permits flexible and efficient use of a vehicles space by providing a seat, which is capable of being stowed in order to permit a wheel chair or other article to be stored in the space formerly occupied by the seat while in the stowed position.

SUMMARY AND OBJECTS OF THE INVENTION

It is an object of the present invention to provide a system for securing a child seat to a stowable seat, which has a stowed and deployed position. Where in the deployed position it may be used to selectively provide a space for positioning a wheelchair in the space formerly occupied by the deployed stowable seat. Further, it is an object to provide a system which utilizes an anchor system, attached to the stowable seat, which cooperates with the child seat in order to releasably secure the child safety seat in static fashion. It is also an object to provide an anchor system that is positioned whereby when it is not being used to secure a child seat it will not interfere with the stowable seat's ability to provide seating for an occupant or its ability to be stowed.

The invention is best suited for passenger cars, trucks, multipurpose passenger vehicles with a gross vehicle weight of 8,500 pounds or less and to buses including school buses, with a gross vehicle weight of 10,000 pounds or less. This invention, accordingly, applies best to passenger vehicles equipped with free-standing passenger seats, to passenger vehicles equipped with three or more forward facing rear designated seating positions, and or to passenger vehicles for which the anchorage system is accessible without removing a seating component of the vehicle. However, this invention is not limited to exclusive use in the aforementioned vehicles.

Accordingly, the stowable seat has a seat base and a seatback. The seat base and seatback are rotatably associated to one another. The seatback may be compacted by being rotated from a substantially vertical position, relative to the horizontal seat base, to a substantially horizontal position, whereby the seatback is folded into close proximity to the seat base.

Attached to the seat base is a support frame. The support frame is responsible for supporting the seat base and seatback and for moving the stowable seat from the deployed position to the stowed position. When the stowable seat is not being used to secure a child seat and the seatback is rotated whereby it is compacted, it may be stowed upon the application of a lifting force applied to the seat base which causes the support frame to move the stowable seat in a cantilevered fashion along a predetermined path from a deployed position to a stowed position. One of the ways of preferably accomplishing this is shown in U.S. Pat. No. 5,492,389.

The seat base also has a seat base frame that is preferably made from steel. Fixedly attached to the seat base frame are up to two anchor systems, which are also preferably made from steel. Each anchor system is an integral and permanent part of a previously existing seat base frame of sufficient strength and durability or is installed as OEM in the vehicle. The means of fixedly attaching the anchor system to the seat base frame entails welding or other well known systems of fastening. Each anchor system can individually secure one child seat. The seat base frame must be sufficiently strong and durable so each anchor system will maintain a child seat statically in a removably fixed and secure location in the event of rapid deceleration or acceleration. Furthermore, each anchor system is positioned whereby when not securing a child safety seat it will not interfere with the ability of the stowable seat to provide seating for an occupant or interfere with the stowable seat's movement from the deployed position to the stowed position.

Each anchor system comprises two vertically oriented anchors that are located proximate to the forward facing side of the seatback and a horizontally oriented anchor that is located proximate to the rearward facing side of the seatback. In the preferred embodiment each anchor is generally U-shaped. The vertically oriented anchors are recessed in cushion padding in order to prevent them from interfering with the ability of the stowable seat to provide seating for an occupant or otherwise make it uncomfortable for such an occupant to sit. Additionally, recessing the vertical anchors insures that they do not interfere with the ability of the seatback to be rotated to a compact horizontal position where it is proximate to the seat base.

When securing a child seat, the two vertically oriented anchors each engage one of two engagement means on the child seat, whereas the horizontally oriented anchor is removably associated with a tether means extending from the child seat. The tether means is pulled taut and locking pins, preferably made from steel, are inserted in order to secure the child seat and to prevent the vertically oriented anchors from prematurely disengaging from the engagement means.

Further objects and advantages of the invention will become apparent from the following description taken in conjunction with the accompanying drawings.

BRIEF DESCRIPTION OF THE DRAWINGS

In order to satisfy the objects of the invention discussed herein, a system for securing a child seat to stowable seat is provided as illustrated by the accompanying drawing wherein.

DESCRIPTION OF THE PREFERRED EMBODIMENTS

Figure 1:
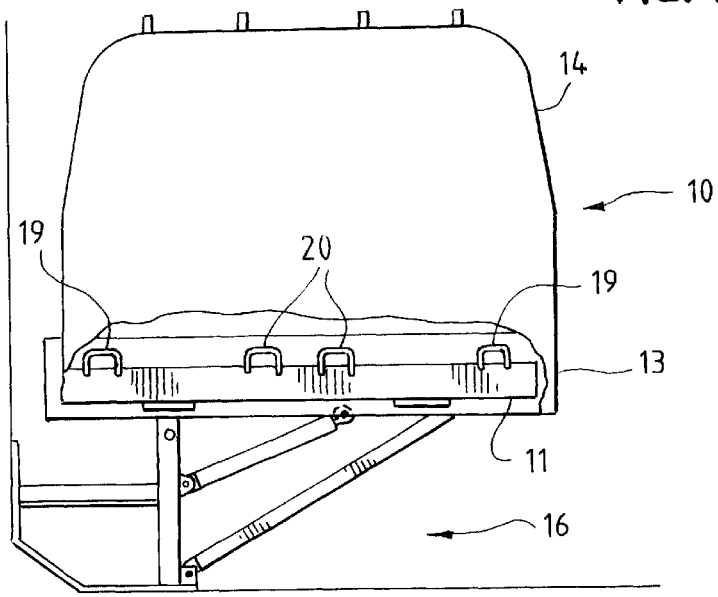
FIG. 1 is a forward side elevational cut away view of the stowable seat in the deployed position, illustrating the vertically oriented anchors of two anchor systems.
Figure 3:
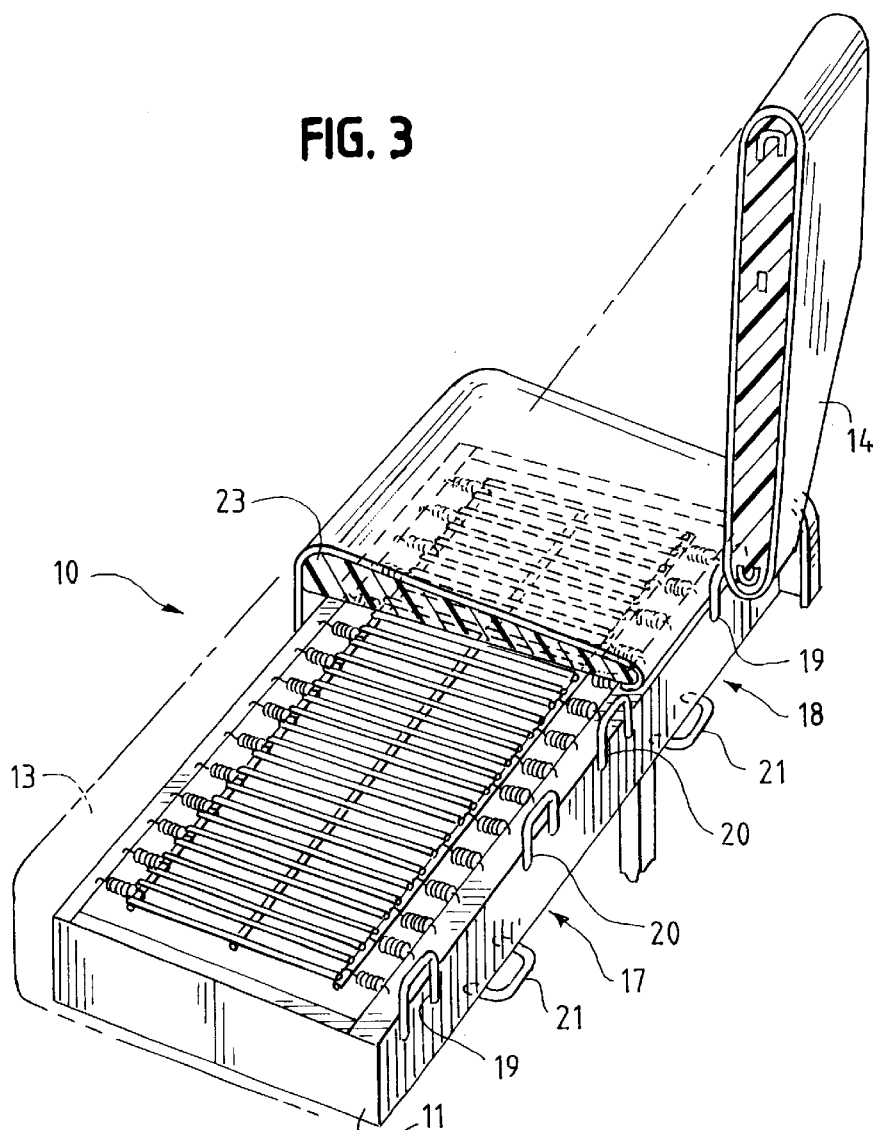
FIG. 3 is a cut away perspective view of the stowable seat in the deployed position, illustrating the horizontally oriented anchors and the vertically oriented anchors of two anchor systems.

Referring to FIGS. 1 and 3, the stowable seat is designated by the reference numeral 10. The stowable seat 10 includes a seat base frame 11, seat base 13, seatback 14, support frame 16, and, as shown only in FIGS. 3, 4, and 5, anchor systems 17 and 18.

In operation, the stowable seat 10 is typically utilized in the deployed position, as shown in FIGS. 1 and 3. The seat base 13 and the seatback 14 are rotatably associated to one another. The seat base 13 is in a horizontal position and seatback 14 is a substantially vertical position. While in the deployed position, the stowable seat 10 may be used to provide seating for up to two occupants or may be used to secure up to two child seats 21. When the stowable seat 10 is not providing seating or being used to secure a child seat 21, it can be stowed in order to provide space for storing a wheel chair 29 or other item in the space formerly occupied by the deployed stowable seat 10.

Figure 2:
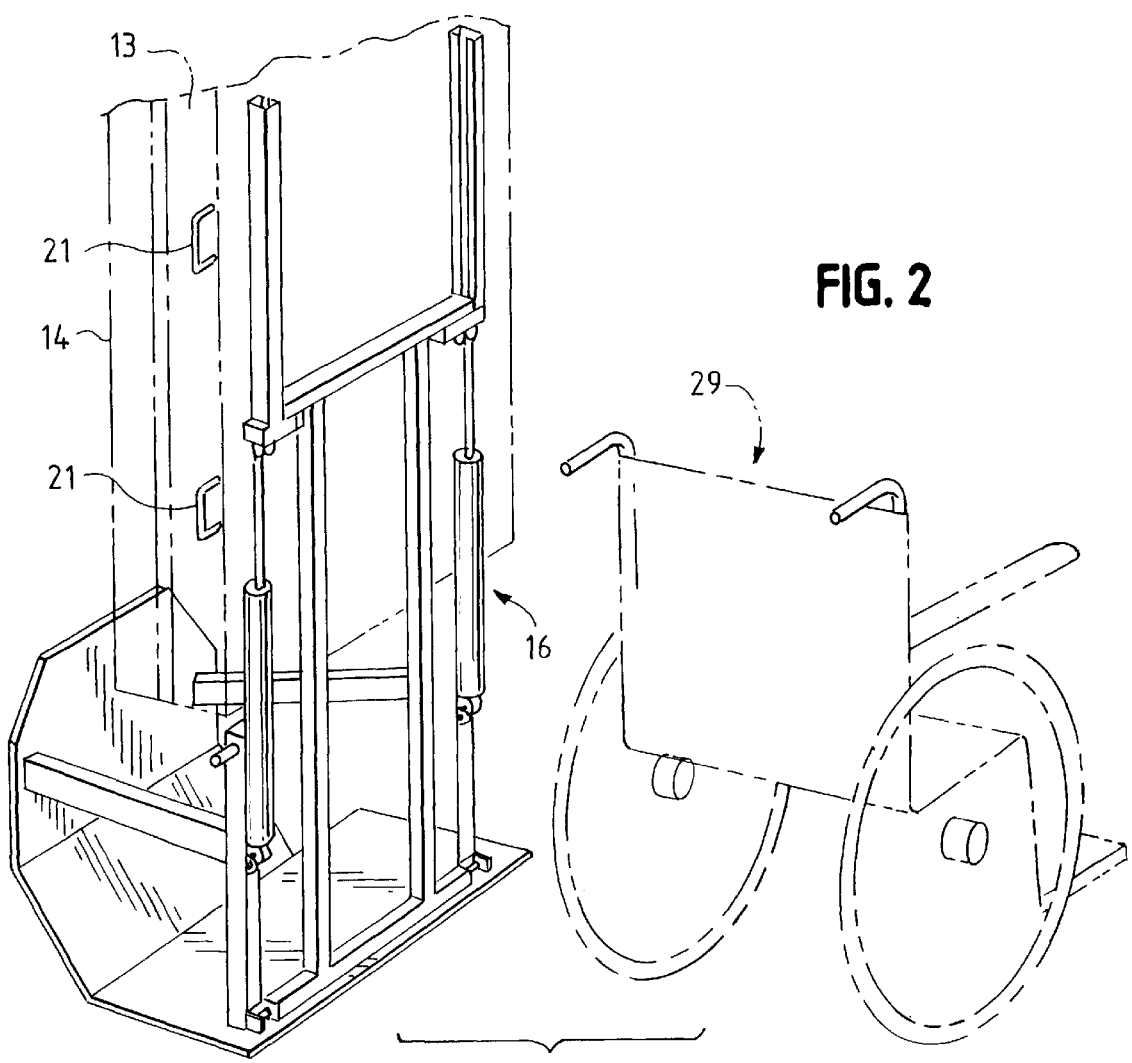
FIG. 2 is a perspective view of the stowable seat in the stowed position, illustrating the horizontally oriented anchors of two anchor systems.

To provide a space for a wheelchair 29 or other article, the stowable seat 10 may be moved from the stowed position to the deployed position, shown in FIG. 2. Support frame 16 supports the seat base 13 and seatback 14 and also enables the stowable seat 10 to be moved from the deployed position to the stowed position. In order to stow the stowable seat 10 it must not be in use and must first be compacted by rotating the seatback 13 to its folded horizontal position proximate to seat base 14. Thereafter, and upon the exertion of a lifting force on the seat base 14, the stowable seat 10 may be moved in cantilevered fashion from the deployed to the stowed position, as is shown in U.S. Pat. No. 5,492,389.

Figure 7A:
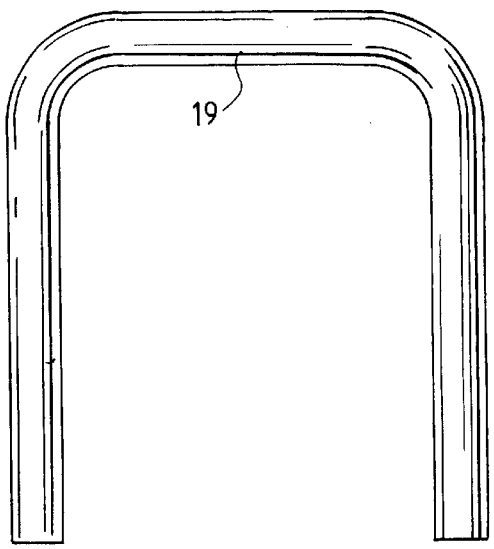
FIG. 7 illustrates the shape of the anchor, including FIG. 7A and FIG. 7B.
Figure 7B:
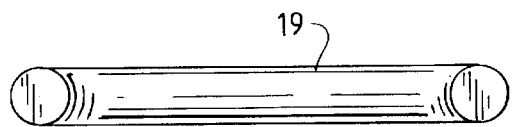

For the purpose of securing a child seat 22, the stowable seat 10 utilizes two anchor systems 17 and 18. As shown in FIG. 3, anchor systems 17 and 18 are identical, however, they are mirror images and are situated on opposite halves of stowable seat 10. Anchor system 17 and 18 each consist of two vertically projecting anchors 19 and 20 and a horizontally projecting anchor 21. FIGS. 7A and 7B illustrate the shape of anchor 19, however, it should be understood that anchor 19 has the identical shape as anchors 20 and 21.

Figure 4:
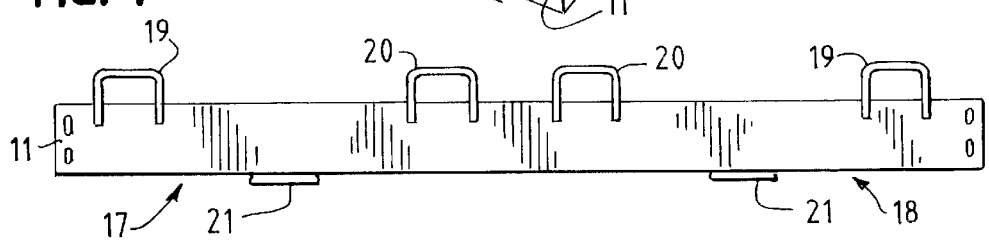
FIG. 4 is a rearward side elevational view of the seatbase frame, illustrating the horizontally oriented anchors and vertically oriented anchors of two anchor systems.
Figure 5:
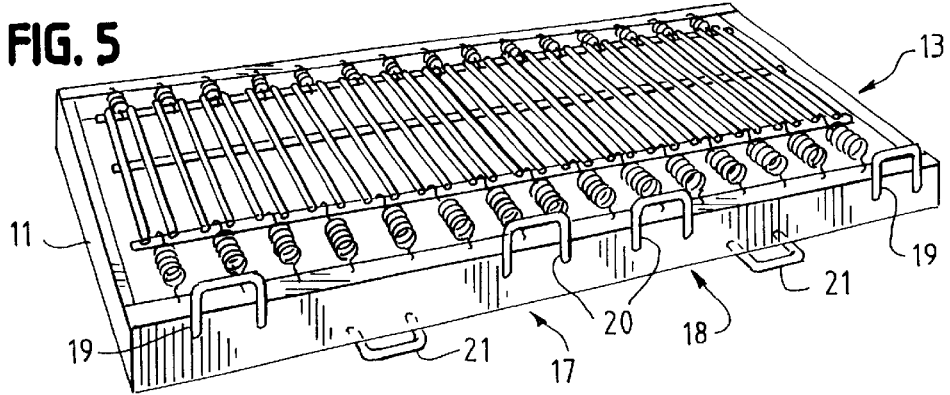
FIG. 5 is a perspective view of the seatbase, showing the seatbase frame fixedly attached to the horizontally oriented anchors and vertically oriented anchors of two anchor systems.

As shown in FIGS. 3, 4, and 5, anchors 19, 20, and 21 are fixedly attached to seat base frame 11. The two vertically oriented anchors 19 and 20 are located proximate to the forward facing side of the seatback 14, whereas horizontally projecting anchor 21 is located proximate to the rearward facing side of seatback 14. Horizontally projecting anchor 21 is located at an equidistant from anchor 19 and anchor 20.

As shown in FIG. 3 when cushion-padding 23 is added to the seat base 13, anchors 19 and 20 are recessed whereby they will not interfere with the ability of the stowable seat 10 to provide seating or with the ability of the seatback 14 to be compacted. Additionally, anchor 21 is positioned on the seat base frame 11, whereby it will not interfere with the ability of the stowable seat 10 to be moved to and from the deployed position and the stowed position.

Figure 6:
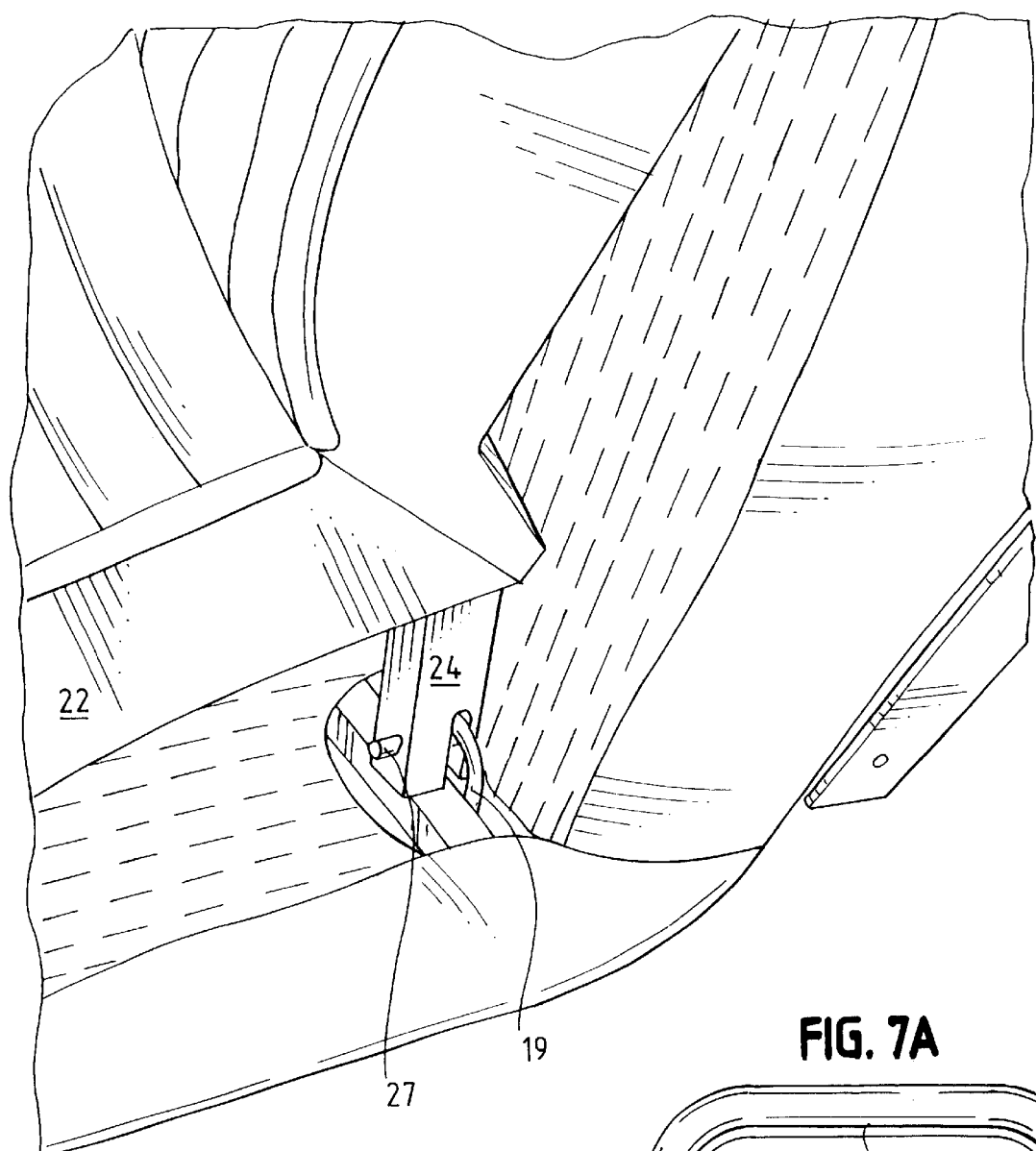
FIG. 6 is a perspective view illustrating how the engagement means, one of the vertically oriented anchors, and a locking pin are arranged when a child seat is secured to the stowable seat.
Figure 8:
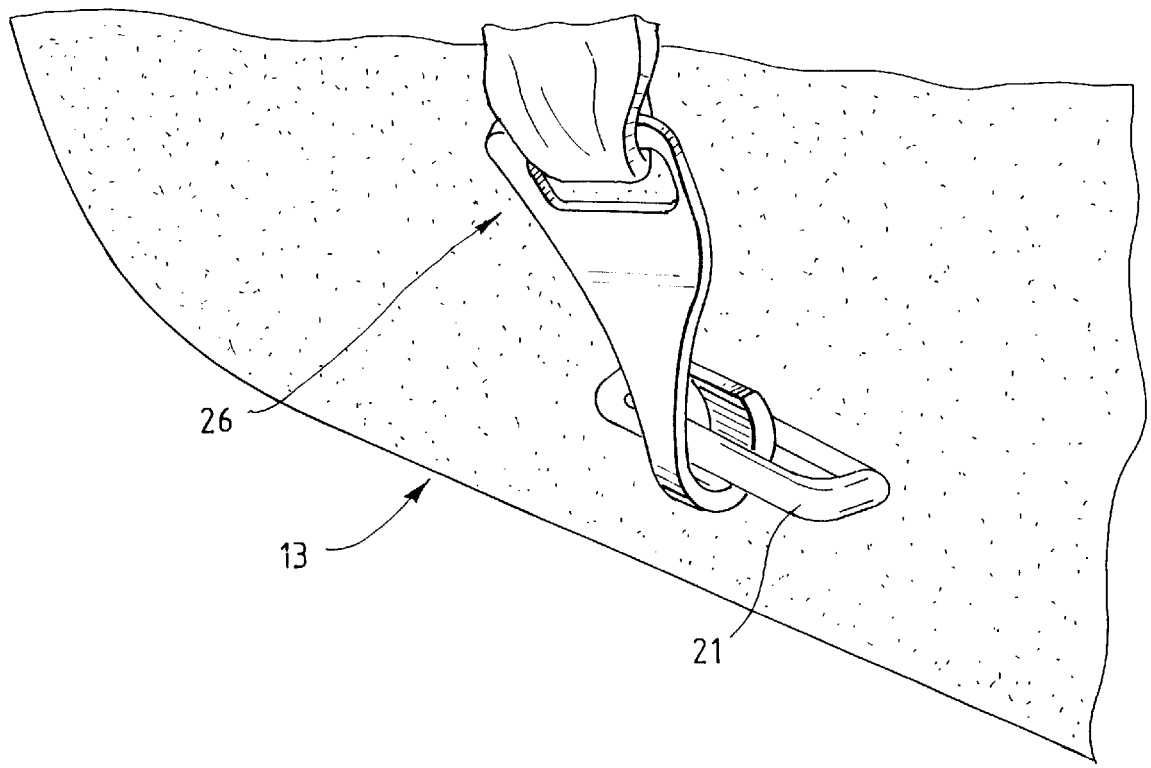
FIG. 8 is a perspective view of the releasable engagement of the tether means with horizontally oriented anchor of an anchor system.
Figure 9:
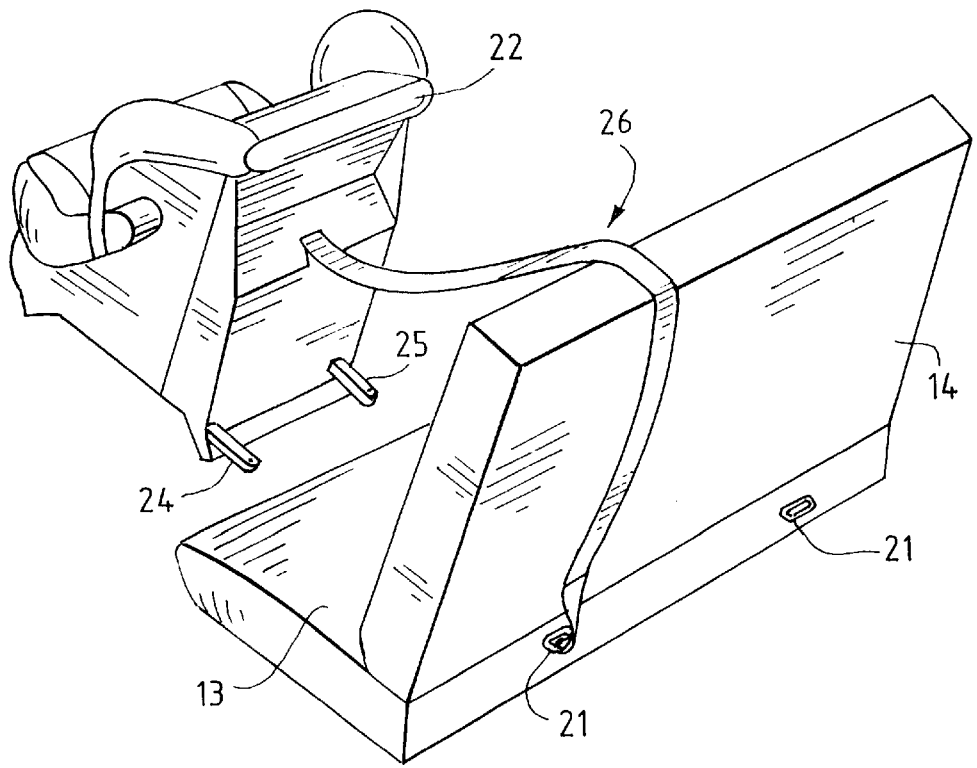
FIG. 9 is a perspective view of the stowable seat and a child seat having two engagement means and tether means, which is releasably associated with a horizontally oriented anchor of an anchor system.

As shown in FIGS. 6, when securing a child seat 22, anchor 19 associates with engagement means 24, which is located on the child seat. Although not illustrated, anchor 20 associates with engagement means 25, in identical fashion. Next, as shown in FIGS. 8 and 9, anchor 21 releasably associates with tether means 25, which is located on the child seat. Lastly, referring generally to FIGS, 6, 8, and 9, the child seat is secured, by making tether means 26 and inserting releasable locking pins 27 and 28, which prevent anchors 19 and 20 from prematurely disassociating from engagement means 24 and 25, respectively. Thereafter, child seat 22 is removably secured in a fixed and static location. When desired, the child seat 22 can be disassociated from said stowable seat 10 by disengaging the tether means from the horizontally oriented anchor 21 and by disengaging anchors 19 and 20 from engagement means 24 and 25 after removing locking pins 27 and 28.

From the foregoing detailed description of the invention, it has been shown how the objects of the present invention have been obtained in a preferred manner. However, inferior embodiments, modifications, and equivalents of the disclosed concepts such as readily occur to those skilled in the art are intended to be included within the scope of the invention.

I claim:

1. A system for removably associating a child seat to a stowable seat, which has a deployed position and stowed position, where the deployed position provides seating for an occupant or secures a child seat, and where removal of the occupant or child seat allows the seat to then be transferred to a stowed position for the purpose of providing space for storing a wheel chair or other object in the space formerly occupied by said stowable seat in the deployed position, comprising:

said stowable seat having a seat base that is rotatably associated with a seatback, said seat base being in a substantially horizontal position while said stowable seat is in the deployed position, said seatback being in a substantially vertical position while said stowable seat is in the deployed position, said seatback being capable rotating from a substantially vertical position to a substantially horizontal position, whereby it is compacted and substantially parallel and in close proximity with said seat base, thereafter the exertion of a lifting force on said seat base causes a support frame to transport said stowable seat in cantilevered fashion along a predetermined path from the deployed position to the stowed position, said support frame supporting said seatback and seat base while said stowable seat is in both the stowed position and deployed position said seat base having a seat base frame, said seat base frame being fixedly attached to an anchor system, said anchor system cooperating with a child seat in order to secure said child seat to said stowable seat, when not securing a child seat said anchor system being positioned whereby it will not interfere with an occupants use or with said stowable seat's ability to be moved from the deployed position to the stowed position, said anchor system having a first and second vertically oriented anchor and a horizontally oriented anchor; and said child seat having a first and second engagement means and a tether means extending therefrom, said tether means being releasably associated with said horizontally oriented anchor, whereas said first and second engagement means being releasably associated with said first and second vertically oriented anchors, respectively, thereafter said tether means can be made taut and first and second locking pins are inserted to prevent said first and second engagement means from prematurely disengaging from said first and second anchors, whereby said child seat is releasably secured and fixed to said stowable seat, and said child seat may be removed by removing the first and second engagement pins and disengaging the tether means from the horizontally oriented anchor, thereafter said stowable seat may be used to provide seating for an occupant or can be moved to the stowed position in order to provide space for storing an item.

2. The stowable seat as defined in claim 1, wherein said first and second vertically oriented anchors are recessed in cushion padding, whereby said first and second anchors do not interfere with said stowable seats ability to provide seating for an occupant or with said seat back's ability to be rotated and compacted.

3. The stowable seat as defined in claim 1, wherein said seat base frame is fixedly attached to two anchor systems, each being capable of securing a child seat.

* * * * *